United States Patent
Rombouts

(10) Patent No.: US 12,514,392 B2
(45) Date of Patent: Jan. 6, 2026

(54) FILTER FOR PREPARING COFFEE OR INFUSION

(71) Applicant: KOFFIE F. ROMBOUTS, naamloze vennootschap, Aartselaar (BE)

(72) Inventor: Xavier Rombouts, Jette (BE)

(73) Assignee: Koffie F. Rombouts N.V., Aartselaar (BE)

( * ) Notice: Subject to any disclaimer, the term of this patent is extended or adjusted under 35 U.S.C. 154(b) by 635 days.

(21) Appl. No.: 17/800,143

(22) PCT Filed: Apr. 29, 2020

(86) PCT No.: PCT/IB2020/054013
§ 371 (c)(1),
(2) Date: Aug. 16, 2022

(87) PCT Pub. No.: WO2021/165727
PCT Pub. Date: Aug. 26, 2021

(65) Prior Publication Data
US 2023/0075342 A1   Mar. 9, 2023

(30) Foreign Application Priority Data
Feb. 18, 2020 (BE) .................................. 2020/5104

(51) Int. Cl.
*A47J 31/06* (2006.01)
*A47J 31/02* (2006.01)
*B65D 85/804* (2006.01)

(52) U.S. Cl.
CPC .......... *A47J 31/0636* (2013.01); *A47J 31/02* (2013.01); *B65D 85/8061* (2020.05)

(58) Field of Classification Search
None
See application file for complete search history.

(56) References Cited

U.S. PATENT DOCUMENTS 2,885,290 A    5/1959  Krasker
3,215,325 A   11/1965  Shappell et al.
(Continued)

FOREIGN PATENT DOCUMENTS

FR    2213757 A1   8/1974
GB     914678 A    1/1963
(Continued)

OTHER PUBLICATIONS

"Roughness measurements of stainless steel surfaces", Safe Food Factory, published Jan. 26, 2021, obtained from Web Jun. 3, 2025, <https://www.safefoodfactory.com/en/editorials/70-roughness-measurements-stainless-steel-surfaces/>. (Year: 2021).*

(Continued)

*Primary Examiner* — Jonathan M Peo
(74) *Attorney, Agent, or Firm* — Dinsmore & Shohl LLP

(57) ABSTRACT

Disclosed herein is a filter configured for preparing coffee or an infusion for single use by being placed on a cup in a use position. The filter includes a tub and a compartment. The tub is configured to receive a liquid. The tub having has a supporting edge extending inwardly from a lower edge of the tub. The supporting edge supports the filter when the filter is placed on the cup in the use position. The compartment has a perforated base. The compartment extends from the support edge. The compartment is at least partly delimited by water-permeable layers configured to be provided with coffee or herbs. At least an outside surface of the supporting edge is provided with a microroughness Ra between IO and 200 μm.

12 Claims, 1 Drawing Sheet

(56) References Cited

U.S. PATENT DOCUMENTS

| | | | |
|---|---|---|---|
| 3,446,624 | A | 5/1969 | Luedtke |
| 3,933,246 | A | 1/1976 | Fulton |
| D270,513 | S | 9/1983 | Wallsten |
| D272,213 | S | 1/1984 | Daenen |
| D283,387 | S | 4/1986 | Durand |
| 4,739,697 | A | 4/1988 | Roberts |
| 4,957,217 | A | 9/1990 | Ritson |
| 4,986,172 | A | 1/1991 | Hunnicutt, Jr. |
| D324,974 | S | 3/1992 | Unger |
| D458,807 | S | 6/2002 | Trazzi |
| D474,110 | S | 5/2003 | Sweeney |
| D598,238 | S | 8/2009 | Durdon et al. |
| D612,732 | S | 3/2010 | Takata et al. |
| D649,054 | S | 11/2011 | Sharma et al. |
| D684,459 | S | 6/2013 | Stowe et al. |
| D746,641 | S | 1/2016 | Panone et al. |
| D791,534 | S | 7/2017 | Bueno |
| D797,503 | S | 9/2017 | Robotti |
| D815,925 | S | 4/2018 | Rapparini et al. |
| D856,750 | S | 8/2019 | Pucci |
| D877,570 | S | 3/2020 | Coleman |
| D920,097 | S | 5/2021 | Rapparini et al. |
| D927,264 | S | 8/2021 | Remo |
| 2002/0113007 | A1 | 8/2002 | Chiodo |
| 2005/0223903 | A1 | 10/2005 | McDaniel |
| 2009/0056557 | A1* | 3/2009 | Lin .................. A47J 31/02 99/323 |
| 2017/0088787 | A1* | 3/2017 | Zia .................. C10M 169/041 |

FOREIGN PATENT DOCUMENTS

| | | |
|---|---|---|
| GB | 2156662 A | 10/1985 |
| IL | 65635 | 6/2021 |
| JP | H04-108038 U | 9/1992 |
| JP | 2005-353030 A | 12/2005 |
| JP | D1682491 | 3/2021 |

OTHER PUBLICATIONS

"Original One Cup Filters", Rombouts Website, Web Page <https://www.rombouts.com/uk/originalocf2.html>, 4 pages, Publication Date unknown, at least Nov. 2021.

"Douwe Egberts Arabica Blend One Cup Filters (Pack of 4)", Amazon Website, Web Page <https://www.amazon.co.uk/Douwe-Egberts-Arabica-Blend-Filters/dp/B006T9YBKG>, 7 pages, Jun. 16, 2014.

Dukkankahve, "One cup filter hikayeden demleme aşamalarini görebilirsiniz. Hizli lezzet", Instagram Post, Web Page <https://www.instagram.com/p/BMLitp_FzwQ/>, 2 Pages, Oct. 30, 2016.

@Rombouts Coffee, "The perfect travel companion?", Twitter Post, Web Page <https://twitter.com/RomboutsCoffee/status/1408356837678850048>, 2 Pages, Jun. 25, 2021.

"Coffee Time Ceramic Mug", Rombouts Website, Web Page <https://www.rombouts.com/uk/coffeetimeceramic.html>, 2 Pages, Publication Date unknown, at least Dec. 2021.

Dukkankahve, "One cup filter hikayeden demleme aşamalarini görebilirsiniz. Hizli lezzet", Instagram Post, Web Page <https://www.instagram.com/p/BMLikxul3Ke/>, 2 Pages, Oct. 30, 2016.

Sian Victoria, "Rombouts Arabica Coffee Review—Filter & Coffee", Sian Victoria Website, Web Page <https://www.sianvictoria.com/blog/rombouts-coffee-review>, 9 Pages, Jul. 18, 2017.

Romboutscoffee, "Buy 4 promotional packs of One Cup Filters and get yourself a FREE coffee storage tin!", Instagram Post, Web Page <https://www.instagram.com/p/BmjaSIWDAat/>, 2 Pages, Aug. 16, 2018.

Gadget Addict, "Tesco one cup drip coffee", YouTube Video, Web Page <https://www.youtube.com/watch?v=RRe3iVcPu-4>, May 4, 2016.

International Search Report and Written Opinion dated Sep. 15, 2020 pertaining to PCT international application No. PCT/IB2020/054013 filed Apr. 29, 2020, pp. 1-12.

* cited by examiner

FILTER FOR PREPARING COFFEE OR INFUSION

CROSS-REFERENCE TO RELATED APPLICATIONS

The present application is the National Phase entry of International Patent Application No. PCT/IB2020/054013 filed Apr. 29, 2020, published as WO 2021/165727 on Aug. 26, 2021, which claims priority to Belgium Patent Application No. 2020/5104 filed Feb. 18, 2020, the entire contents of both are hereby incorporated by reference into this application.

TECHNICAL FIELD

The present disclosure relates to a filter for preparing coffee or an infusion.

In particular the present disclosure relates to filters that can be placed on a cup and subsequently are filled with boiling or hot water, or whereby the water or the oil passes through the coffee or herb containing filter and a freshly brewed coffee or an infusion ends up in the cup.

BACKGROUND

Such filters are known. A special type of such filter is the filter for single use for preparing coffee as specified in GB 914678. Such filter is provided with a tub for pouring liquid, with, when considered in use position, a compartment at the bottom of the tub which is provided at the top and bottom with a permeable layer with coffee or herbs in between. The tub is made of a generally cylindrical or conical jacket, the lower edge of which is provided with an inwardly oriented edge which transitions into a cylindrical part with perforated base, whereby the inwardly oriented edge serves as a supporting edge for the filter when said filter is placed on a cup.

The supporting edge with this known filter is parallel with the base of the filter, and in use is placed on the edge of the underlying cup, after which the tub is filled with hot water. The water passes through the coffee compartment, and fills the cup with fresh coffee.

As the level of the fresh coffee rises, a corresponding volume of air from the cup needs to be discharged outside the cup. However, the air passage is impeded by the filter, the supporting edge of which is closely fitting on the edge of the cup. In addition, the weight of the water in the filter presses this filter on the cup.

The water that filters through produces rising vapours which partly condense on the level of the contact surface between filter and cup, and strengthen the sealing of the cup more.

To obtain the flavour of the coffee or the infusion using such filter, the filter time of the amount of water in the tub is very important. Too short a filter time results in a weak coffee or infusion, and too long a filter time results in cold and less tasty coffee or infusion. The filter time of the water must therefore be controlled within strict limits.

A possible solution for the problem is providing spacers between the edge of the cup and the supporting edge of the coffee filter, the disadvantage being that in the space between the spacers unwanted air bubbles may form.

SUMMARY

Research has shown that this problem can be solved by executing the underside of the supporting edge as a continuous surface with a microroughness Ra between 10 and 200 µm or between 10 and 100 µm, such that between the supporting edge and the edge of the cup micro channels stay open, through which the air can flow such that the water can still pass through the coffee filter within the anticipated timeframe.

According to an embodiment variant, a wide band around the intended supporting edge, or even the whole outside of the filter is executed with a microroughness Ra between 10 and 200 µm or between 10 and 100 µm, such that the filter time remains guaranteed, also with unintended occasional use.

The filter time can also be further guaranteed by executing the inside of the filter as a smooth surface with a limited microroughness between 0 and 10 µm, to allow the water to flow smoothly from the tub wall to the compartment with coffee or herbs.

In some embodiments, the form of the filter is circular because most cups that the filter has to fit on are also circular, but deviating geometries can also be applied whereby the tub and/or the coffee or herb compartment are not cylindrical or conical, but can have an irregular form.

BRIEF DESCRIPTION OF THE DRAWINGS

With the intention of better showing the characteristics of the present disclosure, an embodiment of a filter for coffee or an infusion with a microroughened contact surface according to the present disclosure is described hereinafter, by way of an example without any limiting nature, with reference to the accompanying drawings wherein.

DETAILED DESCRIPTION

Figure 1:
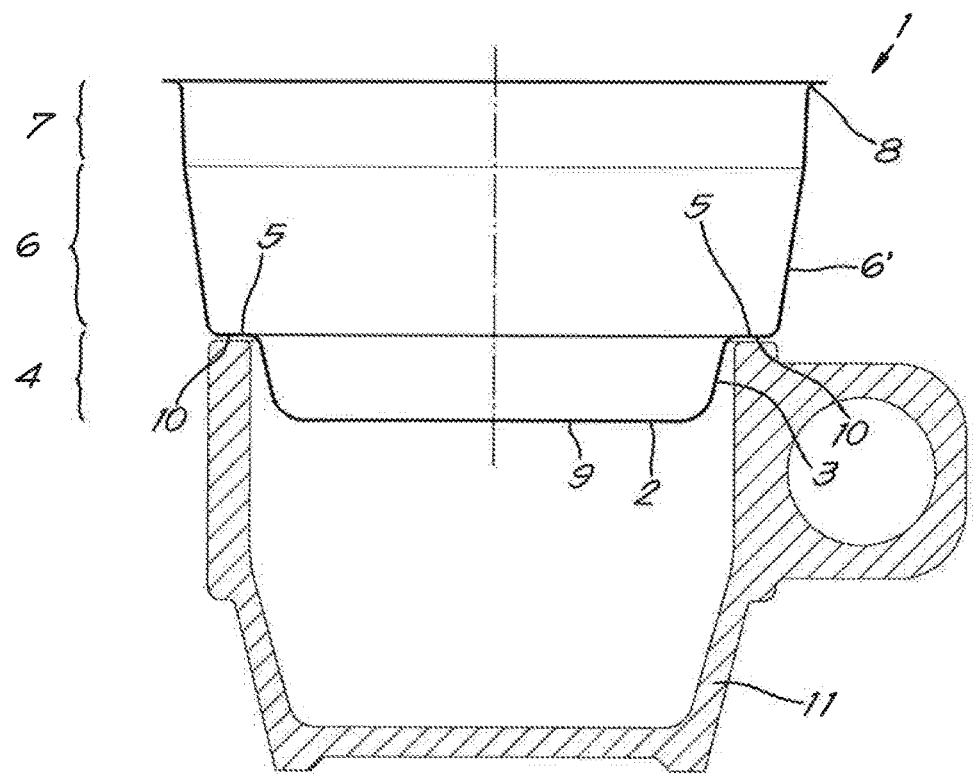
FIG. 1 schematically and in side view shows a filter according to the present disclosure placed on a cup.

FIG. 1 shows a filter 1 for preparing coffee or an infusion including of a circular base 2 which is connected to an ascending wall 3 which forms a compartment 4 intended for storing a dose of ground coffee or herbs for single use and fitting on a supporting edge 5 which connects the compartment 4 for coffee or herbs to a tub 6 for pouring a liquid over, usually water, surrounded by a generally cylindrical or conical jacket 6' above which an edge 7 is located which is provided with a ring-shaped collar 8. The compartment provided at the bottom of the tub 6 is partly delimited by water-permeable layers in which coffee or herbs are provided, and is provided at the bottom with an inwardly oriented supporting edge 5 which transitions into a cylindrical compartment 4 with a base 2 with perforations 9.

For this, the inwardly oriented supporting edge 5 serves as a support for the filter when said filter is placed on a cup 11, whereby at least the outside surface of the supporting edge 5, is provided with a microroughness Ra between 10 and 200 µm. Also, a wider band around the intended supporting edge 5 or even the whole outside of the filter 1 can be provided with a microroughness Ra between 10 and 200 µm.

Figure 2:
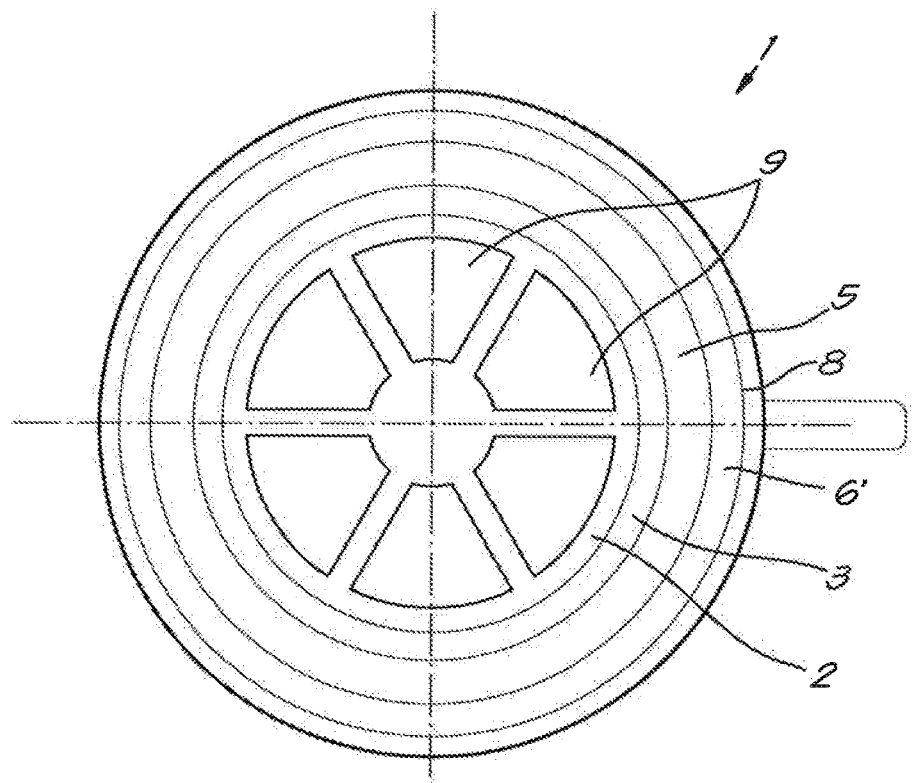
FIG. 2 shows the filter in top view according to FIG. 1.

FIG. 2 shows a top view of FIG. 1, on which the perforations 9 cut away or punched out in the base 2 are clearly visible. The ring-shaped collar 8 of the filter 1 transitions into the surrounding generally cylindrical or conical wall 6' of the tub 6 which transitions into the supporting edge 5 after which the supporting edge transitions into the wall 3 of the cylindrical compartment 4 for coffee or herbs which in turn transitions into the circular base 2.

The operation of the coffee filter 1 with its supporting edge 5 with microroughened contact surface 10 is very simple and as follows.

A coffee-filled filter 1 is placed on an empty cup 11 and subsequently filled with boiling or very hot water up to the notch under the edge 7.

The hot water will filter through the perforations 9 in the base 2 of the filter 1 into the cup placed under it in a controlled filter time. In this filter time a volume of air needs to be discharged from the cup which corresponds with the volume of coffee currently in the cup 11. This air displacement is made possible by micro channels, formed between the microroughened bottom surface 10 of the supporting edge 5, and the edge of the cup 11 on which the filter 1 is resting.

In some embodiments, the tub 6 of the filter 1 does not have to be perfectly circular or cylindrical, but can deviate from this, such that the filter can be universally used on practically all circular cups.

The present disclosure is not limited to the embodiments described as an example and shown in the figures, but a filter according to the present disclosure can be realised in all kinds of forms and dimensions without departing from the scope of the present disclosure, as is described in the following claims.

The invention claimed is:

1. A filter configured for preparing coffee or an infusion, the filter comprises a tub for pouring a liquid over and whereby, when in a use position, a compartment is provided at a bottom of the tub which is partly delimited by water-permeable layers and in which coffee or herbs are provided, whereby the tub is made of a generally cylindrical or conical jacket, a lower edge of the tub is provided with an inwardly oriented supporting edge which transitions into the compartment with a perforated base, whereby the inwardly oriented supporting edge serves as a supporting edge for the filter when the filter is placed on a cup in the use position, wherein at least an outside surface of the supporting edge is provided with a microroughness Ra between 35 and 200 μm, and
wherein the coffee or the infusion is prepared by pouring the liquid over the coffee or the herbs.

2. The filter according to claim 1, wherein the outside surface of the supporting edge is provided with a microroughness Ra between 35 and 100 μm.

3. The filter according to claim 1, wherein a whole outside of the filter is provided with a microroughness Ra between 10 and 200 μm.

4. The filter according to claim 1, wherein a whole outside of the filter is provided with a microroughness Ra between 10 and 100 μm.

5. The filter according to claim 1, wherein a whole inside of the filter is provided with a smooth surface with a microroughness between 0 and 10 μm.

6. A filter configured for preparing coffee or an infusion by being placed on a cup in a use position, the filter comprising:
a tub configured to receive a liquid, the tub having a supporting edge extending inwardly from a lower edge of the tub, the supporting edge supports the filter when the filter is placed on the cup in the use position; and
a compartment having a perforated base, the compartment extending from the supporting edge, the compartment is at least partly delimited by water-permeable layers configured to be provided with coffee or herbs,
wherein at least an outside surface of the supporting edge is provided with a microroughness Ra between 35 and 200 μm,
and
wherein the coffee or the infusion is prepared by pouring the liquid over the coffee or the herbs.

7. The filter according to claim 6, wherein the tub has a generally cylindrical shape.

8. The filter according to claim 6, wherein the tub has a generally conical shape.

9. The filter according to claim 6, wherein the outside surface of the supporting edge is provided with a microroughness Ra between 35 and 100 μm.

10. The filter according to claim 6, wherein an entire outside surface of the filter is provided with a microroughness Ra between 10 and 200 μm.

11. The filter according to claim 9, wherein an entire outside surface of the filter is provided with a microroughness Ra between 10 and 100 μm.

12. The filter according to claim 6, wherein an entire inside surface of the filter is provided with a smooth surface with a microroughness between 0 and 10 μm.

* * * * *